(12) United States Patent
Graham et al.

(10) Patent No.: US 9,237,121 B1
(45) Date of Patent: Jan. 12, 2016

(54) COMMERCIAL EMAIL MANAGEMENT SYSTEM

(71) Applicant: OTC Systems Ltd., London (CA)

(72) Inventors: Timothy Scott Graham, London (CA); Alan James Gilson, Waterloo (CA)

(73) Assignee: OTC Systems, Ltd., London, Ontario (CA)

( * ) Notice: Subject to any disclaimer, the term of this patent is extended or adjusted under 35 U.S.C. 154(b) by 0 days.

(21) Appl. No.: 14/667,334

(22) Filed: Mar. 24, 2015

(51) Int. Cl.
  *G06F 15/16* (2006.01)
  *H04L 12/58* (2006.01)
  *G06Q 10/10* (2012.01)

(52) U.S. Cl.
  CPC .............. *H04L 51/12* (2013.01); *G06Q 10/107* (2013.01)

(58) Field of Classification Search
  None
  See application file for complete search history.

(56) References Cited

U.S. PATENT DOCUMENTS

| | | | |
|---|---|---|---|
| 7,155,243 B2* | 12/2006 | Baldwin et al. | 455/466 |
| 7,219,131 B2* | 5/2007 | Banister et al. | 709/206 |
| 7,564,840 B2* | 7/2009 | Elliott et al. | 370/356 |
| 7,711,779 B2* | 5/2010 | Goodman et al. | 709/206 |
| 7,747,693 B2* | 6/2010 | Banister et al. | 709/206 |
| 7,965,422 B2 | 6/2011 | Hains et al. | |
| 8,036,214 B2* | 10/2011 | Elliott et al. | 370/356 |
| 8,085,761 B2* | 12/2011 | Elliott et al. | 370/356 |
| 8,089,958 B2* | 1/2012 | Elliott et al. | 370/356 |
| 8,270,421 B2* | 9/2012 | Elliott et al. | 370/401 |
| 8,447,967 B1 | 5/2013 | Janacek et al. | |
| 8,693,347 B2* | 4/2014 | Elliott et al. | 370/241 |
| 8,819,142 B1 | 8/2014 | Golub | |
| 8,924,269 B2* | 12/2014 | Seubert et al. | 705/35 |
| 2004/0143635 A1 | 7/2004 | Galea | |
| 2004/0148506 A1 | 7/2004 | Prince | |
| 2004/0199595 A1* | 10/2004 | Banister et al. | 709/207 |
| 2005/0278620 A1* | 12/2005 | Baldwin et al. | 715/513 |
| 2007/0204063 A1* | 8/2007 | Banister et al. | 709/238 |
| 2008/0120129 A1* | 5/2008 | Seubert et al. | 705/1 |
| 2009/0132670 A1 | 5/2009 | Syiek et al. | |
| 2013/0024520 A1* | 1/2013 | Siminoff | 709/206 |
| 2013/0304742 A1 | 11/2013 | Roman et al. | |
| 2014/0114899 A1 | 4/2014 | Wan et al. | |

FOREIGN PATENT DOCUMENTS

AU   2014215972   8/2014

OTHER PUBLICATIONS

Envoke, Email Marketing Software Canada, http://envoke.com/email-marketing.php, pp. 1-5, Oct. 2014.
ITCI Invictus Technologies, CASL Compliant Email Distribution Platform, http://www.itci.ca/Products/CASL-Compliant-Email-Distribution-Platform/, pp. 1-3, Oct. 2014.
SendBlaster, Desktop e-mail marketing software features, http://www.sendblaster.com/en/desktop-e-mail-marketing-software-features, pp. 1-9, Oct. 2014.

* cited by examiner

*Primary Examiner* — Ranodhi Serrao
(74) *Attorney, Agent, or Firm* — Kagan Binder, PLLC

(57) ABSTRACT

An appliance and a method for permission-based email filtering capable of scanning outgoing emails to ensure the emails comply with Canadian Anti-Spam Legislation or similar rules. In one embodiment of the invention, the system intercepts outgoing emails and redirects the email to a remote server. The server compares the recipient's email address to a consent database and distributes the email to the appropriate recipient depending on whether consent from the recipient is known or unknown. If the recipient has previously denied their consent, the recipient is removed from the list of recipients for the email message and the message is not sent to that recipient. In another embodiment of the invention, the system adds a unsubscribe mechanism to the email message.

20 Claims, 5 Drawing Sheets

COMMERCIAL EMAIL MANAGEMENT SYSTEM

FIELD OF THE INVENTION

The present invention relates to an email message management system. More specifically, the present invention provides a permission-based email filtering capable of scanning outgoing emails to ensure commercial electronic messages comply with rules and regulations associated with such email.

BACKGROUND OF THE INVENTION

Governments are increasingly regulating the use of email for commercial purposes. For example, the Canadian Anti-Spam Legislation (CASL) came into effect in Canada in July 2014. One objective of CASL is to protect Canadians from spam email, while allowing continued growth for business in the global market. The introduction of this legislation brought about a need for email filtering systems that facilitate a user's (or "sender's") compliance with CASL.

One aspect of CASL that came into effect in July 2014 was that businesses and organizations cannot send commercial electronic messages if they do not have proper consent from the recipient to send the message. The form of consent may vary, but there must at least be implied consent from the recipient to receive a commercial electronic message.

The current penalties for violating the provisions of CASL include a possible financial penalty, per infraction, of $1,000,000 for individuals and $10,000,000 for businesses. As such, businesses and organizations are provided with a significant incentive to ensure their compliance with the new legislation.

Several known inventions have generally addressed the area of email filtering. However, such tools all have significant limitations.

For example, software has been developed that can be installed by a user that parses outgoing entails, determines whether the recipient of the message is on an unsubscribe list and, if so, removes the unsubscribed recipient from the email's recipient list prior to sending the email.

Many email management systems focus on the filtering of incoming emails. Such systems filter incoming email messages by using a whitelist that compares the email address of the sender of an incoming email message with a list of addresses on a user's pass list. By doing so, the system filters any email messages being received from addresses previously unknown to the user, such as spam.

Despite the many inventions known in the field of email management and email filtering, the known prior art fails to address certain requirements mandated by CASL for sending commercial messages.

SUMMARY OF THE INVENTION

The invention provides an email filtering appliance (or system) for permission-based email filtering for filtering email messages sent by senders on behalf of an organization, where the senders are attempting to send outgoing email messages to external recipient email addresses. The appliance employs a consent database containing recipient email addresses. For each recipient email address in the consent database, an indication that the recipient has either expressly consented or refused consent to receive commercial electronic messages from the sender or the organization is stored. The appliance has an electronic network interface for receiving outgoing email messages from senders, sending notifications to senders and receiving confirmations from senders. For example, this may be an ethernet interface. It has an email transmitter for sending email messages to recipient email addresses. For example this may be a Simple Mail Transfer Protocol (SMTP) server, or simply an interface to an SMTP server. The email filtering engine is configured to receive outgoing email messages from the network interface. Each email message is received from one of the senders and is addressed to a recipient email address. If the email message is addressed to multiple recipient email addresses, then the email message may be processed separately for each recipient email address as described here for a single email address, or preferably the email message may be processed together for all recipient email addresses, as described further below.

The email filtering engine compares the recipient email address to the email addresses stored in the consent database, and determines whether (a) the recipient has expressly consented to receiving the email message, (b) the recipient has expressly refused consent for receiving the email message, or (c) the recipient has neither expressly consented to receiving the email message nor has expressly refused consent for receiving the email message. If the recipient has expressly consented to receiving the email message, the email filtering engine adds an unsubscribe mechanism to the email message and sends the email message to the email transmitter to be sent to the recipient email address. Otherwise, if the recipient has neither expressly consented to receiving the email message nor has expressly refused consent for receiving the email message, the email filtering engine notifies the sender and requests consent confirmation. It then waits for the consent confirmation from the sender, and if the sender confirms that consent has been given, it adds an unsubscribe mechanism to the email message and sends the email message to the email transmitter to be sent to the recipient email address.

The email filtering engine may be an application-specific integrated circuit, or may be a computer processor running software.

The unsubscribe mechanism preferably allows the recipient of the email message from the sender to unsubscribe from commercial electronic messages from that particular sender or from the organization (as represented by the domain name of the sender's email address). If the recipient employs the unsubscribe mechanism, the email filtering appliance updates the consent database based on unsubscribe information provided via the unsubscribe mechanism. The unsubscribe mechanism may further provide the recipient with an option to unsubscribe from email messages sent to the recipient's email address, or to unsubscribe to email messages sent to any email address associated with the recipient email address domain name.

The email filtering engine may be configured to delete the email message without sending it to the recipient email address if the recipient has expressly refused consent for receiving the email message The email filtering engine may also be configurable to notify the sender that the email message has not been sent if the recipient has expressly refused consent for receiving the email message, and then to wait for the sender to confirm that the email message should be sent anyway because the email message is non-commercial. Then, if the sender confirms that the email message should be sent anyway because the email message is non-commercial, then the email filtering engine may send the email message to the email transmitter to be sent to the recipient email address.

Optionally, if consent confirmation has been requested from a sender and is not received within a pre-determined period of time, the email filtering engine may be configured to delete the email message without sending it to the intended recipient(s).

If the email message is addressed to multiple recipient email addresses, then the email filtering engine is preferably further configured to process the email once for all recipient addresses as follows, in this case, the email filtering engine compares each of the recipient email addresses to the email addresses stored in the consent database, and determines, for each recipient email address, whether (a) the recipient has expressly consented to receiving the email message, (b) the recipient has expressly refused consent for receiving the email message, or (c) the recipient has neither expressly consented to receiving the email message nor has expressly refused consent for receiving the email message. If all the recipients have expressly consented to receiving the email message, then the email filtering engine adds an unsubscribe mechanism to the email message and sends the email message to the email transmitter to be sent to the recipient email addresses. Otherwise, if any recipients have been identified as neither expressly consenting to receiving the email message nor expressly refusing consent for receiving the email message, then the email filtering engine delays sending the email message and for each of the identified recipients, requests that the sender provide consent confirmation for the identified recipient. Then the email filtering engine waits for the sender to provide a consent confirmation in response to each request. After all the consent confirmations are received, then the email filtering engine removes any recipient email addresses for recipients determined to have expressly refused consent for receiving the email message, adds an unsubscribe mechanism to the email message, and sends the email message to the email transmitter to be sent to the recipient email addresses.

In a variation of the above described embodiment for processing the email once for multiple recipient addresses, the email filtering engine again first compares each of the recipient email addresses to the email addresses stored in the consent database, and determines, for each recipient email address, whether (a) the recipient has expressly consented to receiving the email message, (b) the recipient has expressly refused consent for receiving the email message, or (c) the recipient has neither expressly consented to receiving the email message nor has expressly refused consent for receiving the email message. If all the recipients have expressly consented to receiving the email message, the email filtering engine adds an unsubscribe mechanism to the email message and sends the email message to the email transmitter to be sent to the recipient email addresses. In this embodiment, the email filtering engine otherwise delays sending the email message and if any recipients have been identified as expressly refusing consent for receiving the email message, then the email filtering engine notifies the sender of the identified recipients and requests that the sender confirm removal of each of the identified recipients. If any recipients have been identified as neither expressly consenting to receiving the email message nor expressly refusing consent for receiving the email message, then the email filtering engine requests that the sender provide consent confirmation for each of the identified recipients. The email filtering engine then waits for the sender to provide consent confirmations and removal confirmations. If the sender provides either a removal confirmation or a consent confirmation in response to each request, then the email filtering engine removes from the email message any recipient email addresses of recipients for whom a removal confirmation has been received, adds an unsubscribe mechanism to the email message, and sends the email message to the email transmitter to be sent to the recipient email addresses.

The sender may be permitted to respond to a request for consent confirmation by providing a removal confirmation. Similarly the sender may respond to a request for removal confirmation by providing a consent confirmation.

The invention also provides methods for performing the above described actions of the email filtering appliance.

DETAILED DESCRIPTION OF THE INVENTION

Figure 1:
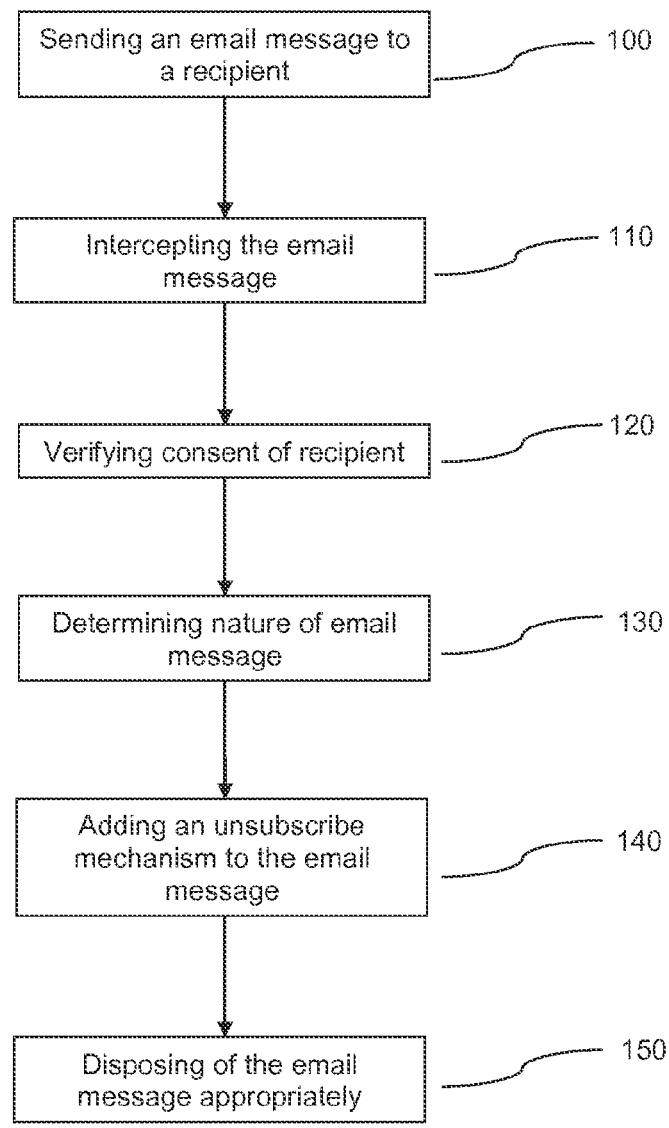
FIG. 1 is a flow diagram illustrating the core logic according to one embodiment of the present invention.

In the drawings and description that follows, specific embodiments of the present invention are described in detailed and are shown in the drawings with the understanding that the present disclosure is an exemplification of the principles of the invention, and is not intended to limit the invention to what is illustrated and described herein. For example, certain method steps described herein may be performed in a different order to achieve the same result, as will be understood by a skilled artisan.

The flow diagram in FIG. 1 illustrates the core logic used in the present an embodiment of the email message management system and the associated method (collectively referred to herein as the "email processing system"). The email processing system is configured to receive all, or a portion of, the outgoing email messages for a particular organization (typically a company) having a particular domain name. For example, the company Acme Inc. may have domain name acme.com, and people (senders) sending emails on behalf of the organization may then have email addresses such as sender1@acme.com. The organization's systems are configured to send external email to the email processing system, which acts as an SMTP smart host.

Initially, a user sends an email message to one or more recipients 100 using a computer and an email client, such as Microsoft Outlook®. After the user sends the email message, the email is typically delivered to any local recipients (in the organization's domain) via the organization's network, and if the email is addressed to one or more external recipients, then the email is routed to the email processing system prior to the email actually being sent to the external recipients. A recipient is considered to be external, for example, if the recipient's email address has a different domain name than the sender. Therefore, the email is intercepted 110 and effectively paused from being sent to external recipients.

In a preferred embodiment of the present invention (not shown in FIG. 1), the system identifies and stores, in computer readable memory, the addresses of each of the intended recipients of the email contained in the SMTP RCPT TO portion of the SMTP transmission of the email message. This includes an email address for each intended recipient included in the RCPT TO portion, whether entered by the sender in a TO, CC or BCC field. The DATA portion of the SMTP email, which is normally sent to every recipient, specifies the TO and CC recipients only, which are contained in the header portion of the DATA. Each email address in any of the TO, CC or BCC fields is considered to be an intended recipient of the email message.

The email processing system processes the email message for each of the intended recipients who are external recipients. For each such recipient, the email processing system verifies the consent of the recipient 120 by comparing the recipient's email address with a "whitelist" of addresses stored in a consent database for which addresses consent has been provided and is in effect. In one embodiment, the consent database is stored on a remote server located off-premises from the sending organization. Alternatively, however, the consent database may be stored locally on the user's network.

The most recent consent for each recipient is determined by searching the consent database for consent indications associated with the recipient address. The present invention contemplates the use and existence of various forms of consent. For instance, the consent can be specific consent between the sender of the email message and the recipient of the email message. Alternatively, the consent can be for the specific sender of the email message to send commercial email to any email address in the recipient domain, for example in the case that an entire company has consented to receiving messages from a specific sender. Another form of consent that could be stored in the consent database is consent from a specific recipient for receiving email messages from all users from a particular domain, such that the recipient has consented to receive messages from anyone within the sending company. Yet another form of consent could be between the domains of the sender and the recipient, for instance if an entire company has consented to receiving messages from anyone within the sending company.

In certain embodiments of the present invention, the timeframe that a particular type of consent is valid depends on the nature of consent. For instance, if consent is express consent from a specific recipient for receiving messages from a specific sender, the consent may remain valid indefinitely. Alternatively, if the consent is from an entire company for receiving messages from anyone within a sending company, the consent may only remain valid for a number of weeks or months. After the timeframe for the validity of consent expires, the sender of the message would be required to re-obtain consent from the recipients and update the consent database accordingly. A person skilled in the art would understand that the timeframes for maintaining the validity of consent described herein are examples only and are not meant to be limiting in any way.

In certain embodiments of the present invention, before or after verifying the consent of the recipient 120, the nature of the email message is determined 130. For example, if the recipient of the message has previously indicated that he or she does not consent to receiving commercial electronic messages, or if the consent for receiving commercial electronic messages from the sender of the message is unknown, the system may determine the nature of the email message 130 prior to sending, withholding or deleting the message 150.

One method of determining the nature of the email message is further described below in reference to FIG. 3. Alternatively, the nature of the email message may be determined first and if the email message is determined to be a personal email and not a commercial electronic message, then the email may immediately be sent and the remaining steps skipped. In such a case, the recipient's consent for receiving the message is irrelevant for the purposes of complying with CASL, for example, and the appliance will send the email message to the recipient, notwithstanding an express lack of consent, or unknown consent, from the recipient for receiving commercial electronic messages from the user. However, given the difficulty in automatically assessing whether an email message is commercial in nature, it is preferred that the email processing system not attempt to do this, but rather notify the sender and allow the sender the option of confirming that the email message is non-commercial in nature.

In a preferred embodiment of the invention, the appropriate disposition of the email message 150 will depend on the consent of the recipient 120 and the nature of the email message 130. This aspect of the invention is further discussed in reference to FIG. 2 below.

Where there is only a single external recipient, then once consent from the recipient is verified 120, an unsubscribe mechanism is added to the email message 140 and the message is sent. In a preferred embodiment, the unsubscribe mechanism is added to the footer of the email message, but in other embodiments, the unsubscribe mechanism may be added to any part of the email message. The unsubscribe mechanism allows a recipient to inform the sender of the email message that they do not consent to receiving commercial electronic messages from the user, or that they have withdrawn their consent for receiving commercial electronic messages. In one embodiment of the present invention, the unsubscribe link enables the recipient of the message to activate the unsubscribe mechanism to provide the recipient with the option of unsubscribing from receiving commercial electronic messages from the specific sender of the message or unsubscribe from an entire domain, such as the entire organization of the sender.

Once consent has been verified 120, the recipients that have previously expressed a refusal of consent for the receipt of commercial electronic messages are removed from the list of recipients and from the TO an CC portions of the DATA header. This ensures that other recipients of the email message will not include unsubscribed or removed recipients if they repy-all to the email message.

As described above, in a preferred embodiment, the unsubscribe mechanism is added to the footer of the email message. This may be done by adding a HyperText Markup Language (HTML) footer, or it may be added by using another markup or coding language. It may also be added as a plain text footer. In a preferred embodiment, the footer added will use the same encoding as the body of the email message, to ensure that formatting or coding errors do not arise when sending or receiving the message. For example, the encoding may be quoted-printable, base64, or any other type of encoding scheme. In certain embodiments, the body of the email message may need to be decoded and re-encoded in order to add the footer of the message.

Once consent is verified 120, for instance as express consent from the recipient, and the unsubscribe mechanism is added to the email message 140, the message is sent to an email transmitter (such as a server) that sends the email message to the recipient. This ensures that the email message is only sent to recipient addresses that were part of the original RCPT TO addresses, excluding local recipients to whom the email has already been sent, but also that any recipients that have been removed as a recipient address do not receive the message, for instance if the recipient previously expressed a denial of consent.

The recipient addresses that are blind carbon copied (BCCed) in the email message may be processed by the system, such that they do not appear in the header of the email message but are included as part of the RCPT TO addresses. This ensures that consent exists for addresses that are blind carbon copied to the email message, such that recipients that are blind carbon copied on the email will not receive the message if they have previously expressed a denial of consent for the receipt of commercial electronic messages from the user or the domain of the user.

In a further embodiment of the present invention, the system tracks relevant information associated with the message, such as the sender, the recipients, the time the message was sent and the form of consent used to authorize the sending of the commercial electronic message. This ensures that such information is available to a user in the event the user needs it.

Figure 2:
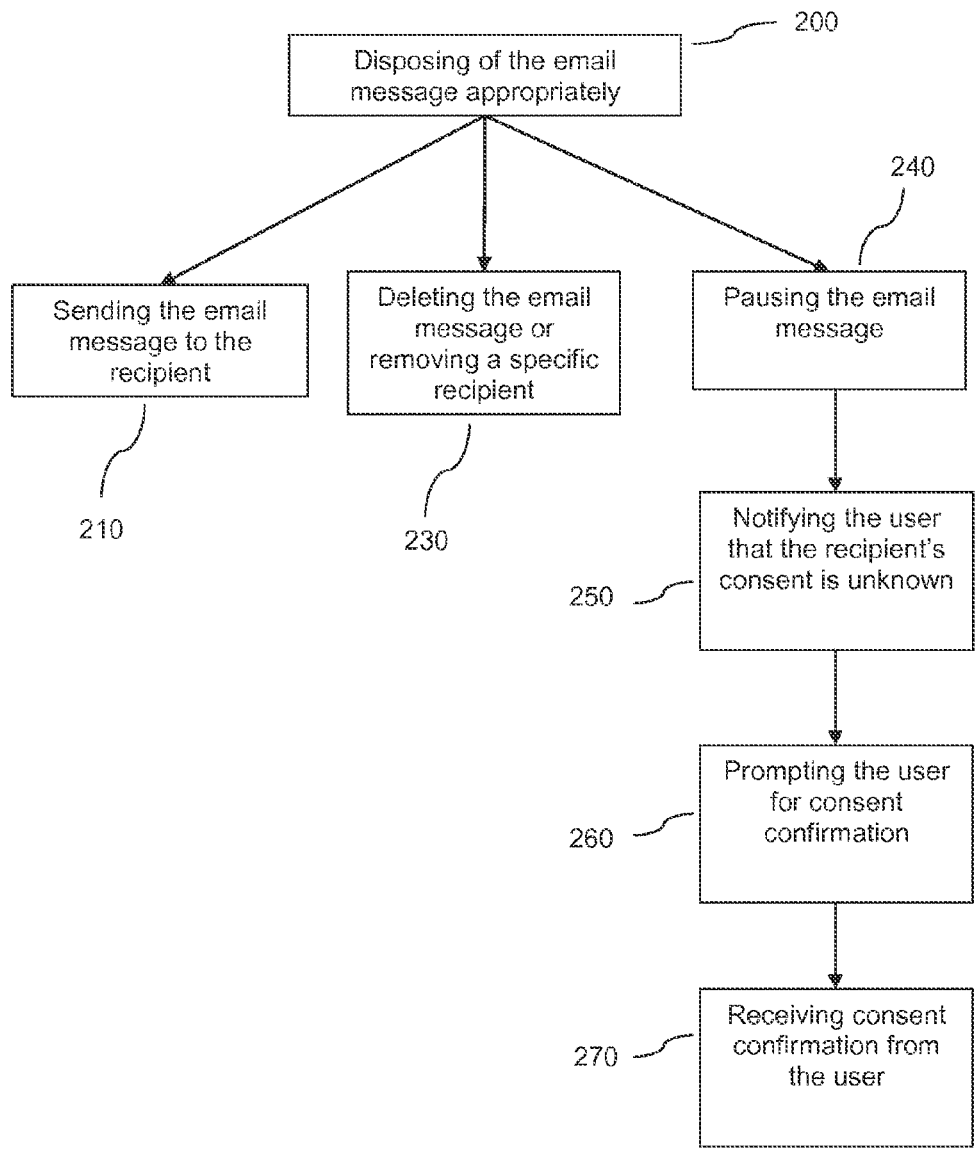
FIG. 2 is a flow diagram illustrating methods that may be used to send the email message to the recipient, remove the recipient from the mailing list, or delay the sending of the email message pending consent confirmation, depending on whether the recipient's consent for receiving the message is known or unknown, according to another embodiment of the present invention.

Referring now to FIG. 2, and as described above, in a preferred embodiment, the appropriate disposition of the email message 200 depends on the nature of the message as well as whether the recipient has consented to receiving commercial electronic messages from the sender or the sender's domain. For example, if the system determines that the recipient of the email message has consented to receiving commercial electronic messages from the sender, the email message is sent to the recipient 210. Alternatively, if the system determines that the recipient has previously expressed a denial of consent for the receipt of commercial electronic messages from the sender, the message is deleted or the recipient is removed from the RCPT TO addresses 230.

If the consent of the recipient is unknown, the email message is paused from being sent to the recipient 240. In one embodiment of the present invention, the user is notified that the recipient's consent is unknown 250. This notification may be through a pop-up window that appears on the user's desktop, or by an email being sent to the user notifying him or her of such. The user may then be prompted to confirm that the recipient has consented 260 to receiving commercial electronic messages from the user, or alternatively to confirm that the message is non-commercial in nature. If the user confirms that the recipient has consented to receiving commercial electronic messages from the user, this information is stored in the consent database for future reference. Similarly, if the user indicates that the recipient has denied consent, this information is also stored in the consent database for future reference.

Once consent confirmation is received from the user 270, the system disposes of the email message appropriately 200, for instance by sending the email message to the recipient if the recipient has consented 210 or removing the recipient 230 from the RCPT TO addresses if the recipient has denied consent.

In yet another embodiment of the present invention, the notification sent to the user 250 and the options available to the user when prompted for consent confirmation 260 include an option for the user to confirm that the message is not a commercial electronic message.

Figure 3:
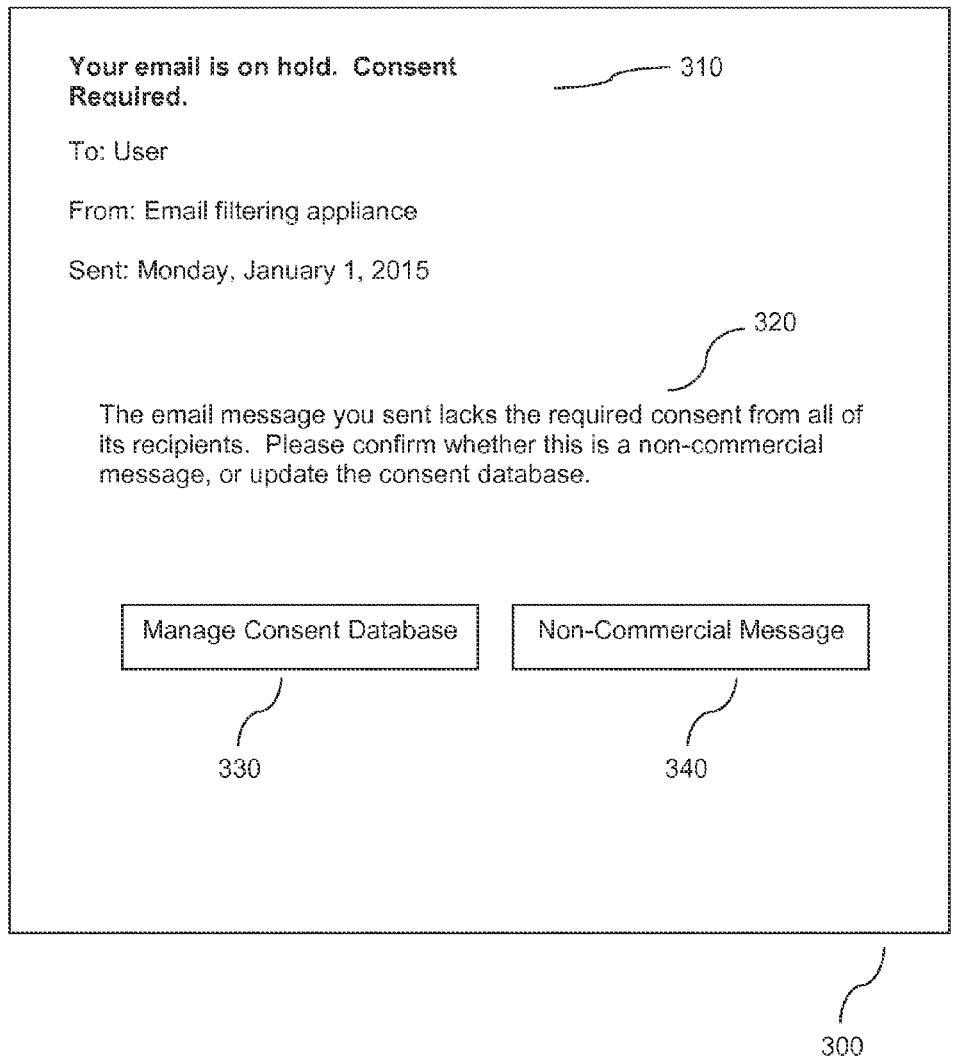
FIG. 3 is an illustration of an example notification message that may be sent to the user if the recipient has not expressly consented to receiving the email message.

FIG. 3 is an illustrative example of a notification email 300 that can be sent to the user if consent from a recipient is unknown or known to be denied. In the example notification email 300 shown in FIG. 3, the notification email includes header information 310, including the subject of the notification email, the sender of the notification email, the recipient of the notification email and the date the notification email was sent. The notification email also includes a body 320 that informs the user that the email message sent by the user lacks the requisite consent from one or more recipients of the email message.

In one embodiment of the present invention, the notification email 300 includes a link for the user to manage the consent database 330. Managing the consent database 330 allows the user to add or remove recipient addresses from the consent database. In a further embodiment, the notification email 300 includes a link that allows the user to indicate the nature of the email message 340, for instance to indicate that the email message is a non-commercial message 340.

Figure 4:
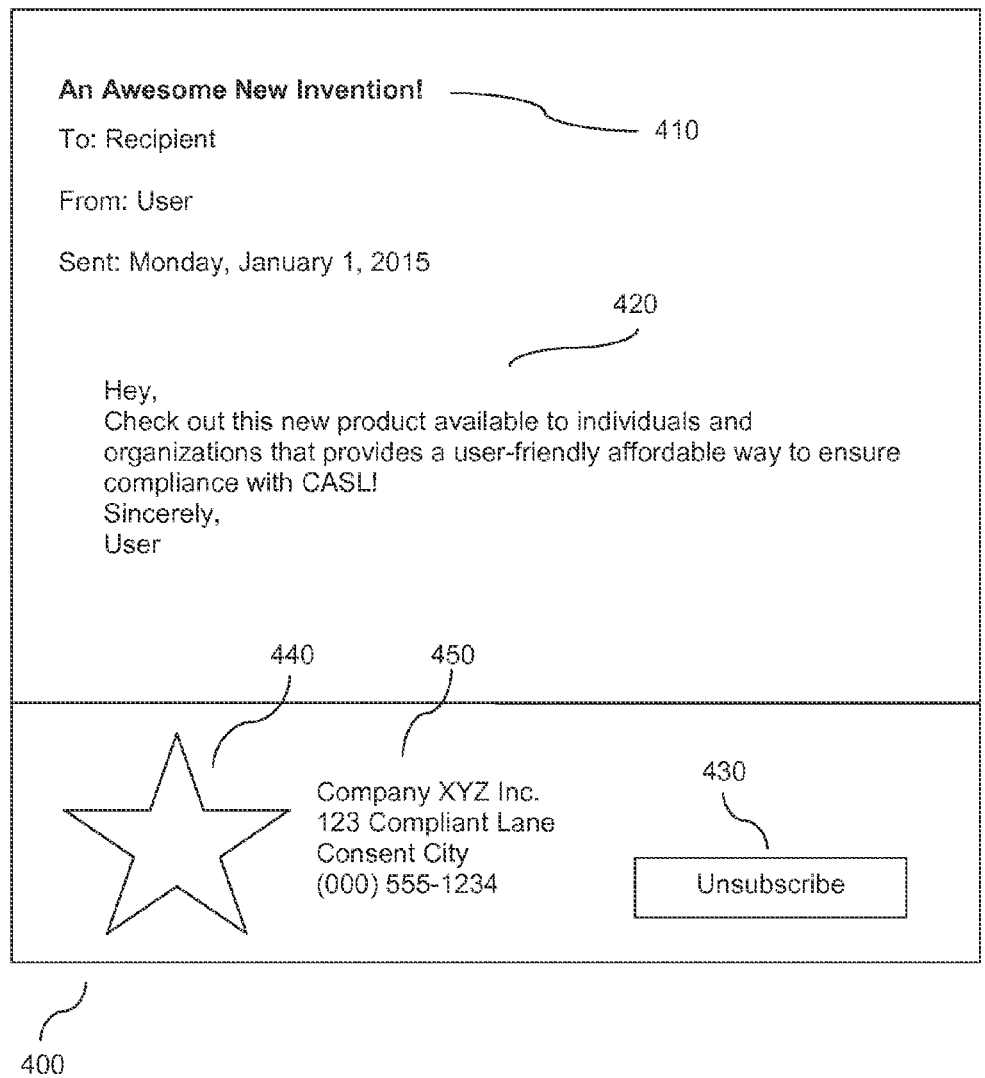
FIG. 4 is an illustration of an example email message that may be sent to a recipient, including an unsubscribe mechanism, a user's customization and the user's contact details, according to a further embodiment of the present invention.

FIG. 4 is an illustrative example of an email 400 sent to a recipient after consent for receiving the message has been confirmed. The email 400 includes header information 410, such as the subject of the email, the sender of the email, the recipient of the email and the date the email was sent. The email 400 also includes the body 420 of the email sent by the user. The email 400 also includes an unsubscribe mechanism 430, such as the unsubscribe mechanism described above, as well as all information required by applicable legislation, such as contact information for the sender.

In a further embodiment of the present invention, the email 400 also includes customizations 440, 450 to the footer of the email. The desired customizations 440, 450 may include the user's company logo 440 or contact details 450 of the user or the user's company.

Figure 5:
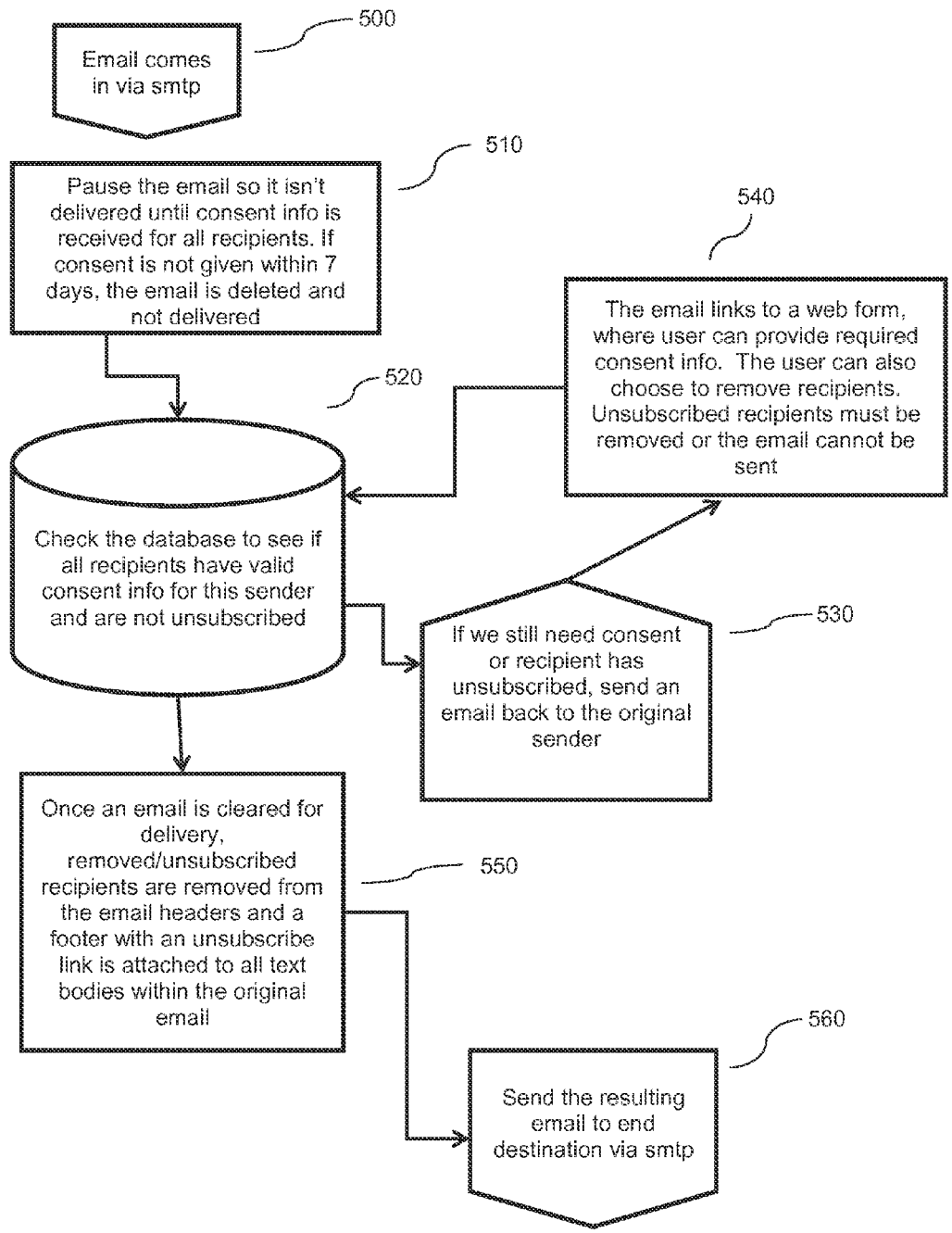
FIG. 5 is a flow diagram illustrating the core logic used in an embodiment of the present invention.

FIG. 5 is a flow diagram illustrating the core logic used in an embodiment of the present invention. In the embodiment shown in FIG. 5, the system intercepts the email message sent by the user via SMTP 500. Similar to the method described above in reference to FIG. 1, the email is paused so that it is not delivered to the recipient(s) until consent is verified for all recipients 510. The system determines whether all the recipients have consented to receiving commercial electronic messages by comparing the recipient addresses with addresses stored in a consent database 520. If the consent for certain recipients is unknown or known to be denied, for instance if the user has unsubscribed, the system notifies the user via a notification email and prompts the user for consent confirmation 530. The notification email can be substantially similar to the notification email described above in reference to FIG. 3. The notification email may contain a link to a web form or to the consent database, which allows a user to provide the requisite consent information. The user may also use this web form or consent database to remove recipients or to indicate that they have or have not consented to receiving commercial electronic messages from the user or the user's domain.

In a further embodiment of the present invention, the system will not allow the email to be sent until unsubscribed recipients are removed from the recipient addresses of the email message by the user 540. The system may notify the sender of a recipient who has refused consent and then wait until the sender provides a refusal confirmation indicating that the recipient can be removed, or alternatively provides a consent confirmation if the sender has been able to obtain express consent.

Once the user has provided the required consent information, the system verifies that all recipients of the email message have consented to receiving the message 520. Any recipients that have not consented to receiving the message 550 are removed from the RCPT TO addresses. Additionally, a header and/or a footer are added to the email message 550. Further, an unsubscribe mechanism, which may be in the form of an unsubscribe HTML link, is added to the footer of the email message 550. Alternatively, the unsubscribe mechanism may be added to the body of the email message 550.

Once consent has been verified and an unsubscribe mechanism has been added to the email message, the email is sent to the recipient via SMTP.

In the embodiment of the invention shown in FIG. 5, the email is deleted from the system and not delivered to the recipient if consent confirmation is not provided by the user within a certain timeframe, such as 7 days from the date of notification 510. A person skilled in the art will understand that this timeframe can be altered, depending on the user's preference.

The appliance of the present invention can also create a report of outbound email activity sent from the user or the user's organization.

All of the processing described above may be performed by, for example, an application-specific integrated circuit (ASIC) custom designed to implement and embodiment of the invention. Preferably, they are implemented in the form of executable software runs on a programmable computer processor and that allows the user to install the system onto their computing device locally. The appliance may be implemented as a standalone device (like a typical internet router) with ethernet and Wi-Fi interfaces. Alternatively, the appliance may take the form of a general purpose computer system running software to implement the above described processing, where the computer system may perform other functions in addition to the email filtering function.

Generally, a computer, computer system, computing device, client or server, as will be well understood by a person skilled in the art, includes one or more than one computer processor, and may include separate memory, and one or more input and/or output (I/O) devices (or peripherals) that are in electronic communication with the one or more processor(s). The electronic communication may be facilitated by, for example, one or more busses, or other wired or wireless connections. In the case of multiple processors, the processors may be tightly coupled, e.g. by high-speed busses, or loosely coupled, e.g. by being connected by a wide-area network.

A computer processor, or just "processor", is a hardware device for performing digital computations. A programmable processor is adapted to execute software, which is typically stored in a computer-readable memory. Processors are generally semiconductor based microprocessors, in the form of microchips or chip sets. Processors may alternatively be completely implemented in hardware, with hard-wired functionality, or in a hybrid device, such as field-programmable gate arrays or programmable logic arrays. Processors may be general-purpose or special-purpose off-the-shelf commercial products, or customized application-specific integrated circuits (ASICs). Unless otherwise stated, or required in the context, any reference to software running on a programmable processor shall be understood to include purpose-built hardware that implements all the stated software functions completely in hardware.

Multiple computers (also referred to as computer systems, computing devices, clients and servers) may be networked via a computer network, which may also be referred to as an electronic network or an electronic communications network. When they are relatively close together the network may be a local area network (LAN), for example, using Ethernet. When they are remotely located, the network may be a wide area network (WAN), such as the interact, that computers may connect to via a modem, or they may connect to through a LAN that they are directly connected to.

Computer-readable memory, which may also be referred to as a computer-readable medium or a computer-readable storage medium, which terms have identical (equivalent) meanings herein, can include any one or a combination of non-transitory, tangible memory elements, such as random access memory (RAM), which may be DRAM, SRAM, SDRAM, etc., and nonvolatile memory elements, such as a ROM, PROM, FPROM, OTP NVM, EPROM, EEPROM, hard disk drive, solid state disk, magnetic tape, CDROM, DVD, etc.). Memory may employ electronic, magnetic, optical, and/or other technologies, but excludes transitory propagating signals so that all references to computer-readable memory exclude transitory propagating signals. Memory may be distributed such that at least two components are remote from one another, but are still all accessible by one or more processors. A nonvolatile computer-readable memory refers to a computer-readable memory (and equivalent terms) that can retain information stored in the memory when it is not powered. A computer-readable memory is a physical, tangible object that is a composition of matter. The storage of data, which may be computer instructions, or software, in a computer-readable memory physically transforms that computer-readable memory by physically modifying it to store the data or software that can later be read and used to cause a processor to perform the functions specified by the software or to otherwise make the data available for use by the processor. In the case of software, the executable instructions are thereby tangibly embodied on the computer-readable memory. It is the express intent of the inventor that in any claim to a computer-readable memory, the computer-readable memory, being a physical object that has been transformed to record the elements recited as being stored thereon, is an essential element of the claim.

Software may include one or more separate computer programs configured to provide a sequence, or a plurality of sequences, of instructions to one or more processors to cause the processors to perform computations, control other devices, receive input, send output, etc.

It is intended that the invention includes computer-readable memory containing any or all of the software described herein. In particular, the invention includes such software stored on non-volatile computer-readable memory that may be used to distribute or sell embodiments of the invention or parts thereof.

It should be understood that the above-described embodiments of the present invention, particularly, any "preferred" embodiments, are only examples of implementations, merely set forth for a clear understanding of the principles of the invention. Many variations and modifications may be made to the above-described embodiment(s) of the invention as will be evident to those skilled in the art. That is, persons skilled in the art will appreciate and understand that such modifications and variations are, or will be, possible to utilize and carry out the teachings of the invention described herein.

Where, in this document, a list of one or more items is prefaced by the expression "such as" or "including", is followed by the abbreviation "etc.", or is prefaced or followed by the expression "for example", or "e.g.", this is done to expressly convey and emphasize that the list is not exhaustive, irrespective of the length of the list. The absence of such an expression, or another similar expression, is in no way intended to imply that a list is exhaustive. Unless otherwise expressly stated or clearly implied, such lists shall be read to include all comparable or equivalent variations of the listed item(s), and alternatives to the item(s), in the list that a skilled person would understand would be suitable for the purpose that the one or more items are listed.

The words "comprises" and "comprising", when used in this specification and the claims, are used to specify the presence of stated features, elements, integers, steps or components, and do not preclude, nor imply the necessity for, the presence or addition of one or more other features, elements, integers, steps, components or groups thereof.

The scope of the claims that follow is not limited by the embodiments set forth in the description. The claims should be given the broadest purposive construction consistent with the description and figures as a whole.

What is claimed is:

1. An email filtering appliance for filtering email messages sent by senders on behalf of an organization, the senders attempting to send outgoing email messages to external recipient email addresses, the appliance employing a consent database containing recipient email addresses and for each recipient email address an indication of whether the recipient has either expressly consented or refused consent to receive commercial electronic messages from the sender or the organization, the appliance comprising:

an electronic network interface comprising hardware for receiving outgoing email messages from senders, sending notifications to senders and receiving confirmations from senders;

an email transmitter comprising hardware for sending email messages to recipient email addresses;

an email filtering engine comprising a computer processor configured to:

receive from the network interface an outgoing email message from one of the senders addressed to a plurality of recipient email addresses;

compare each of the recipient email addresses to the email addresses stored in the consent database, and determine for each recipient email address, whether (a) the recipient has expressly consented to receiving the email message, (b) the recipient has expressly refused consent for receiving the email message, or (c) the recipient has neither expressly consented to receiving the email message nor has expressly refused consent for receiving the email message;

if all the recipients have expressly consented to receiving the email message, add an unsubscribe mechanism to the email message and send the email message to the email transmitter to be sent to the recipient email addresses;

otherwise, if any recipients have been identified as neither expressly consenting to receiving the email message nor expressly refusing consent for receiving the email message, then delay sending the email message and, for each of the identified recipients, request that the sender provide consent confirmation for the identified recipient, wait for the sender to provide consent confirmation in response to each request, and then remove any recipient email addresses for recipients determined to have expressly refused consent for receiving the email message, add an unsubscribe mechanism to the email message and send the email message to the email transmitter to be sent to the recipient email addresses.

2. The email filtering appliance of claim 1, wherein the computer processor is an application-specific integrated circuit.

3. The email filtering appliance of claim 1, wherein the email filtering engine comprises a computer processor running software.

4. The email filtering appliance of claim 1, wherein the network interface is an ethernet interface.

5. The email filtering appliance of claim 1, wherein the unsubscribe mechanism allows each of the recipients of the email message from the sender to unsubscribe from commercial electronic messages from the sender or from the organization, and if the recipient employs the unsubscribe mechanism, the email filtering appliance updates the consent database based on unsubscribe information provided via the unsubscribe mechanism.

6. The email filtering appliance of claim 5, wherein the unsubscribe mechanism provides each of the recipient with an option to unsubscribe from email messages sent to the recipient email address, or to unsubscribe to email messages sent to any email address associated with the recipient email address domain name.

7. The email filtering appliance of claim 1, wherein the email filtering engine is further configured to delete the email message without sending it to the recipients email address if all the recipients have expressly refused consent for receiving the email message.

8. The email filtering appliance of claim 1, wherein the email filtering engine is further configured to (a) notify the sender that the email message has not been sent if at least one of the recipients has expressly refused consent for receiving the email message, (b) wait for the sender to confirm that the email message should be sent anyway because the email message is non-commercial, and (c) if the sender confirms that the email message should be sent anyway because the email message is non-commercial, then send the email message to the email transmitter to be sent to the recipient email addresses.

9. The email filtering appliance of claim 1, wherein the recipient email addresses include at least one email address that was specified to be a blind carbon copy (BCC) recipient, and the BCC recipient either expressly consented to receiving the email message or a consent confirmation was received in respect of the BCC recipient, and then the sending of the email by the email transmitter comprises sending the email message to the recipients, including the BCC recipient, without indicating the BCC recipient in the sent email message or in any metadata transmitted to the recipients of the email message.

10. An email filtering appliance for filtering email messages sent by senders on behalf of an organization, the senders attempting to send outgoing email messages to external recipient email addresses, the appliance employing a consent database containing recipient email addresses and for each recipient email address an indication of whether the recipient has either expressly consented or refused consent to receive commercial electronic messages from the sender or the organization, the appliance comprising:

an electronic network interface comprising hardware for receiving outgoing email messages from senders, sending notifications to senders and receiving confirmations from senders;

an email transmitter comprising hardware for sending email messages to recipient email addresses;

an email filtering engine comprising a computer processor configured to:

compare each of the recipient email addresses to the email addresses stored in the consent database, and determine, for each recipient email address, whether (a) the recipient has expressly consented to receiving the email message, (b) the recipient has expressly refused consent for receiving the email message, or (c) the recipient has neither expressly consented to receiving the email message nor has expressly refused consent for receiving the email message;

if all the recipients have expressly consented to receiving the email message, add an unsubscribe mechanism to the email message and send the email message to the email transmitter to be sent to the recipient email addresses; and otherwise, delay sending the email message and (d) if any recipients have been identified as expressly refusing consent for receiving the email message, then notify the sender of the identified recipients and request that the sender confirm removal of each of the identified recipients, and (e) if any recipients have been identified as neither expressly consenting to receiving the email message nor expressly refusing consent for receiving the email message, then request that the sender provide consent confirmation for each of the identified recipients, (f) wait for the sender to provide consent confirmations and removal confirmations, and (g) if the sender provides either a removal confirmation or a consent confirmation in response to each request, then remove from the email message any recipient email addresses of recipients for whom a removal confirmation has been received, add an unsubscribe mechanism to the email message, and send the email message to the email transmitter to be sent to the recipient email addresses.

11. The email filtering appliance of claim 10, wherein the recipient email addresses include at least one email address that was specified to be a blind carbon copy (BCC) recipient, and the BCC recipient either expressly consented to receiving the email message or a consent confirmation was received in respect of the BCC recipient, and then the sending of the email by the email transmitter comprises sending the email message to the recipients, including the BCC recipient, without indicating the BCC recipient in the sent email message or in any metadata transmitted to the recipients of the email message.

12. A method of permission-based email filtering performed by an email filtering appliance comprising a computer processor for filtering emails sent by senders on behalf of an organization, the senders attempting to send outgoing email messages to external recipient email addresses, the method employing a consent database containing recipient email addresses and for each recipient email address an indication of whether the recipient has either expressly consented or refused consent to receive commercial electronic messages from the sender or the organization, the method comprising, for each outgoing email message from one of the senders addressed to a plurality of recipient email addresses, the steps of:

intercepting the email message received from a hardware interface of the email filtering appliance;

comparing, by the computer processor, each of the recipient email addresses to the email addresses stored in the consent database, and determining, by the computer processor, for each recipient email address, whether (a) the recipient has expressly consented to receiving the email message, (b) the recipient has expressly refused consent for receiving the email message, or (c) the recipient has neither expressly consented to receiving the email message nor has expressly refused consent for receiving the email message;

if all the recipients have expressly consented to receiving the email message, adding, by the computer processor, an unsubscribe mechanism to the email message and sending, by the computer processor, the email message to the recipient email addresses; and otherwise, if any recipients have been identified as neither expressly consenting to receiving the email message nor expressly refusing consent for receiving the email message, then delaying, by the computer processor, sending message and, for each of the identified recipients requesting, by the computer processor, that the sender provide consent confirmation for the identified recipient, waiting, by the computer processor, for the consent confirmation from the sender in response to each request, and then removing, by the computer processor, any recipient email addresses for recipients determined to have expressly refused consent for receiving the email message, adding, by the computer processor, an unsubscribe mechanism to the email message and sending, by the computer processor via a hardware interface, the email message to the recipient email address.

13. The method of claim 12, wherein the unsubscribe mechanism allows each of the recipients of an email message from the sender to unsubscribe from commercial electronic messages from the sender or from the organization, and if the recipient employs the unsubscribe mechanism, the email filtering appliance updates the consent database based on unsubscribe information provided via the unsubscribe mechanism.

14. The method of claim 13, wherein the unsubscribe mechanism provides each of the recipients with an option to unsubscribe from email messages sent to the recipient email address, or to unsubscribe to email messages sent to any email address associated with the recipient email address domain name.

15. The method of claim 12, further comprising a step of notifying the sender that the email message has not been sent if all the recipients have expressly refused consent for receiving the email message.

16. The method of claim 12, wherein the recipient email addresses include at least one email address that was specified to be a blind carbon copy (BCC) recipient, and the BCC recipient either expressly consented to receiving the email message or a consent confirmation was received in respect of the BCC recipient, and then the sending of the email comprises sending the email message to the recipients, including the BCC recipient, without indicating the BCC recipient in the sent email message or in any metadata transmitted to the recipients of the email message.

17. A method of permission-based email filtering performed by an email filtering appliance comprising a computer processor for filtering emails sent by senders on behalf of an organization, the senders attempting to send outgoing email messages to external recipient email addresses, the method employing a consent database containing recipient email addresses and for each recipient email address an indication of whether the recipient has either expressly consented or refused consent to receive commercial electronic messages from the sender or the organization, the method comprising, for each outgoing email message from one of the senders addressed to a plurality of recipient email addresses, the steps of:

intercepting the email message received from a hardware interface of the email filtering appliance;

comparing, by the computer processor, each of the recipient email addresses to the email addresses stored in the consent database, and determining, by the computer processor, for each recipient email address, whether (a) the recipient has expressly consented to receiving the email message, (b) the recipient has expressly refused consent for receiving the email message, or (c) the recipient has neither expressly consented to receiving the email message nor has expressly refused consent for receiving the email message;

if all the recipients have expressly consented to receiving the email message, adding, by the computer processor, an unsubscribe mechanism to the email message and sending, by the computer processor, the email message to the recipient email addresses; and otherwise, delaying by the computer processor, sending the email message and (d) if any recipients have been identified as expressly refusing consent for receiving the email message, then by the processor, the sender of the identified recipients and requesting that the sender confirm removal of the identified recipients, and (e) if any recipients have been identified as neither expressly consenting to receiving the email message nor expressly refusing consent for receiving the email message, then requesting, by the computer processor, that the sender provide consent confirmation for each identified recipient, (f) waiting by the computer processor, for the sender to provide consent confirmations and removal confirmations, and (g) if the sender provides either a removal confirmation or a consent confirmation in response to each request, then removing, by the computer processor, any recipient email addresses of recipients for whom a removal confirmation has been received, adding, by the computer processor, an unsubscribe mechanism to the email message, and sending, by the computer processor, the email message.

18. The method of claim 17, wherein the sender can respond to a request for consent confirmation by providing a removal confirmation.

19. The method of claim 17, wherein the sender can respond to a request for consent confirmation by updating the consent database to indicate that the recipient has expressly consented to receiving commercial electronic messages.

20. The method of claim 19, wherein the email filtering appliance periodically checks the consent database after requesting consent confirmation for a recipient to determine if the consent database has been updated to indicate that the recipient has consented, and when the email filtering appliance determines that the consent database has been so updated, consent confirmation is deemed to have been received for that recipient.

* * * * *

UNITED STATES PATENT AND TRADEMARK OFFICE
CERTIFICATE OF CORRECTION

PATENT NO.        : 9,237,121 B1
APPLICATION NO.   : 14/667334
DATED             : March 24, 2015
INVENTOR(S)       : Timothy Scott Graham and Alan James Gilson It is certified that error appears in the above-identified patent and that said Letters Patent is hereby corrected as shown below:

Claims

Column 12,
Line 7, claim 6, "each of the recipient" should be -- each of the recipients --

Column 15,
Line 9, claim 17, "email message, then by the processor," should be -- email message, then notifying, by the computer processor, --

Signed and Sealed this
Twenty-fourth Day of May, 2016

Michelle K. Lee
*Director of the United States Patent and Trademark Office*